US012689287B2

(12) United States Patent
Yu et al.

(10) Patent No.: US 12,689,287 B2
(45) Date of Patent: Jul. 21, 2026

(54) METHOD AND APPARATUS FOR REGULATING CONVERTER BY REDUCING A RIPPLE COMPONENT

(71) Applicant: AcLeap Power Inc., Taipei City (TW)

(72) Inventors: Qixue Yu, Shanghai (CN); Lishen Zhou, Shanghai (CN); Qin Sun, Shanghai (CN)

(73) Assignee: OmniOn Power Technology GmbH, Baden (CH)

( * ) Notice: Subject to any disclaimer, the term of this patent is extended or adjusted under 35 U.S.C. 154(b) by 230 days.

(21) Appl. No.: 18/544,753

(22) Filed: Dec. 19, 2023

(65) Prior Publication Data

US 2024/0243654 A1 Jul. 18, 2024

(30) Foreign Application Priority Data

Jan. 13, 2023 (CN) ......................... 202310072727.X

(51) Int. Cl.
*H02M 1/14* (2006.01)
*H02M 1/42* (2007.01)
(52) U.S. Cl.
CPC ............ *H02M 1/14* (2013.01); *H02M 1/4208* (2013.01)
(58) Field of Classification Search
CPC ................................................ H02M 1/12–15
See application file for complete search history.

(56) References Cited

U.S. PATENT DOCUMENTS

| | | | |
|---|---|---|---|
| 5,383,107 A * | 1/1995 | Hopkins | H02M 1/12 |
| | | | 363/41 |
| 9,709,606 B1 * | 7/2017 | Cho | G01R 19/04 |
| 2013/0082674 A1 * | 4/2013 | Soleno | H02M 3/33523 |
| | | | 323/283 |

FOREIGN PATENT DOCUMENTS

JP       2000033044 A * 2/2000

OTHER PUBLICATIONS

Machine translation of JP 2000033044-A (Year: 2000).*

* cited by examiner

*Primary Examiner* — Peter M Novak
(74) *Attorney, Agent, or Firm* — CKC & Partners Co., LLC

(57) ABSTRACT

Embodiments of the present disclosure provide methods and apparatus for regulating a converter. The method includes: extracting a ripple voltage in a first frequency band from an input voltage of the converter, the ripple voltage being associated with a ripple component in the input voltage; and regulating a parameter of the converter based on at least the ripple voltage to reduce a ripple component in output of the converter in the first frequency band. The solution of the present disclosure makes it possible to extract the ripple voltage with higher accuracy and to reduce or even eliminate the ripple component of the frequency output by the converter in a cost-effective manner.

8 Claims, 7 Drawing Sheets

100

102

EXTRACT A RIPPLE VOLTAGE IN A FIRST FREQUENCY BAND FROM AN INPUT VOLTAGE OF THE CONVERTER, THE RIPPLE VOLTAGE BEING ASSOCIATED WITH A RIPPLE COMPONENT IN THE INPUT VOLTAGE

104

REGULATE A PARAMETER OF THE CONVERTER BASED ON AT LEAST THE RIPPLE VOLTAGE TO REDUCE A RIPPLE COMPONENT IN THE FIRST FREQUENCY BAND IN AN OUTPUT OF THE CONVERTER

METHOD AND APPARATUS FOR REGULATING CONVERTER BY REDUCING A RIPPLE COMPONENT

CROSS-REFERENCE TO RELATED APPLICATIONS

This application claims priority to Chinese Patent Application No. 202310072727.X, filed Jan. 13, 2023, and titled "METHOD AND APPARATUS FOR REGULATING CONVERTER", which is hereby incorporated by reference in its entirety.

BACKGROUND

Embodiments of the present disclosure generally relate to power electronics, and more particularly to methods and apparatus for regulating a converter.

A Power Factor Correction (PFC) module may be used in a rectifier, such as a wireless charger, to meet certain industry standards. In the rectifier, the output of the Power Factor Correction module is the input to the DC/DC converter. Since the Power Factor Correction module ensures that an input current phase tracks an input voltage, the output voltage of the Power Factor Correction module (i.e., the input voltage of the DC/DC converter) will generate a sinusoidal ripple with a frequency of twice the frequency of an input line.

Since the voltage of the ripple is affected by the output capacitance and output power of the Power Factor Correction module, in some designs, in order to meet the requirements of the output ripple of the DC/DC converter, a larger control loop bandwidth can be configured to obtain a larger low frequency gain, thereby suppressing the output ripple. However, in some cases, such a method of achieving a large low frequency gain by increasing the control loop bandwidth may not work or be implemented. For example, as the size of the rectifier module needs to be smaller, a very high power density is required, and in this case, the bus capacitance of the Power Factor Correction module output is usually very small, which increases the amplitude of the ripple. Even if the bandwidth is large, the result may not be satisfactory to meet the output requirements of the DC/DC converter. As another example, in a rectifier of a wireless charging module, fast closed-loop control is almost impossible. Therefore, the ripple suppression effect cannot be effectively realized. Alternatively, some rectifiers have specific operating conditions that result in loop bandwidths that are not too large. Therefore, in order to ensure the function of the Power Factor Correction module and to suppress the output power ripple of the rectifier, an additional design of these converters is generally required, which makes the system more complex and involves a cost increase.

Therefore, there is a need for a simple circuit that can effectively eliminate or greatly reduce the output power frequency ripple caused by the Power Factor Correction module at a low cost.

BRIEF DESCRIPTION

Based on the above problems, according to an example embodiment of the present disclosure, a control method for an inverter and an inverter system are provided.

In a first aspect of the present disclosure, there is provided a method of regulating a converter. The method includes: extracting a ripple voltage in a first frequency band from an input voltage of the converter, the ripple voltage being associated with a ripple component in the input voltage; and regulating a parameter of the converter based on at least the ripple voltage to reduce a ripple component in the first frequency band in an output of the converter.

According to an embodiment of the present disclosure, the ripple component in the output of the converter in the first frequency band is minimized or eliminated by means of feedforward control by accurately extracting the ripple voltage from the input voltage of the converter and taking into account when regulating the parameters.

In some embodiments of the present disclosure, extracting the ripple voltage includes: determining, via an average value filter, an average voltage value associated with an average value of the input voltage; determining, via a divider resistor, an instantaneous voltage value associated with an instantaneous value of the input voltage; and extracting, via an amplifier coupled to the average value filter and the divider resistor, the ripple voltage based on a difference between the average voltage value and the instantaneous voltage value.

In some embodiments of the present disclosure, extracting the ripple voltage includes: determining a quasi-peak voltage value associated with a quasi-peak value of the input voltage via a quasi-peak filter; determining, via a divider resistor, an instantaneous voltage value associated with an instantaneous value of the input voltage; and extracting, via an amplifier coupled to the quasi-peak filter and the divider resistor, the ripple voltage based on a difference between the quasi-peak voltage value and the instantaneous voltage value.

In some embodiments of the present disclosure, the method further includes: in response to a control module of the converter being located on a secondary side of the converter, isolating from the control module via an isolation module coupled to the amplifier.

In some embodiments of the present disclosure, the method further includes: scaling the difference via a gain converter coupled to the isolation module.

In some embodiments of the present disclosure, the average value filter includes a resistor and a capacitor arranged in parallel.

In some embodiments of the present disclosure, the quasi-peak filter includes a passive filter or an active filter.

In some embodiments of the present disclosure, the quasi-peak filter includes: a first capacitor having a first end and a second end, wherein the first end is coupled to a reference end; and a diode having a first end and a second end, the first end of the diode being coupled to the second end of the first capacitor and the second end of the diode being coupled to the reference end via a second capacitor.

In some embodiments of the present disclosure, regulating a parameter of the converter includes: regulating, based on an amplitude of the ripple voltage, one or more of a pulse width, a frequency, and a phase shift angle of the converter.

In some embodiments of the present disclosure, the converter is a converter in a wireless charger.

In a second aspect of the present disclosure, an apparatus for regulating a converter is provided. The apparatus includes: a ripple extraction module configured to extract a ripple voltage in a first frequency band from an input voltage of the converter, the ripple voltage being associated with a ripple component in the input voltage; and a parameter regulation module configured to regulate a parameter of the converter based on at least the ripple voltage to reduce a ripple component in the first frequency band in an output of the converter.

In some embodiments of the present disclosure, the apparatus further includes: an average value filter configured to determine an average voltage value associated with an average value of the input voltage; a divider resistor configured to determine an instantaneous voltage value associated with an instantaneous value of the input voltage; and an amplifier coupled to the average value filter and the divider resistor and configured to extract the ripple voltage based on a difference between the average voltage value and the instantaneous voltage value.

In some embodiments of the present disclosure, the apparatus further includes: a quasi-peak filter configured to determine a quasi-peak voltage value associated with a quasi-peak value of the input voltage; a divider resistor configured to determine an instantaneous voltage value associated with an instantaneous value of the input voltage; and an amplifier coupled to the quasi-peak filter and the divider resistor and configured to extract the ripple voltage based on a difference between the quasi-peak voltage value and the instantaneous voltage value.

In some embodiments of the present disclosure, the apparatus further includes: an isolation module coupled to the amplifier and configured to isolate from a control module in response to the control module of the converter being located on a secondary side of the converter.

In some embodiments of the present disclosure, the apparatus further includes: a gain converter coupled to the isolation module and configured to scale the difference.

In some embodiments of the present disclosure, the average value filter includes a resistor and a capacitor arranged in parallel.

In some embodiments of the present disclosure, the quasi-peak filter includes a passive filter or an active filter.

In some embodiments of the present disclosure, the quasi-peak filter includes: a first capacitor having a first end and a second end, wherein the first end is coupled to a reference end; and a diode having a first end and a second end, the first end of the diode being coupled to the second end of the first capacitor and the second end of the diode being coupled to the reference end via a second capacitor.

In some embodiments of the present disclosure, the parameter regulation module is configured to: regulate, based on an amplitude of the ripple voltage, one or more of a pulse width, a frequency, and a phase shift angle of the converter.

In some embodiments of the present disclosure, the converter is a converter in a wireless charger.

It is to be understood that the description in the summary section is not intended to define key or critical features of the embodiments of the disclosure, nor is it intended to limit the scope of the disclosure. Other features of the present disclosure will become readily apparent from the following description.

BRIEF DESCRIPTION OF THE DRAWINGS

Through the following detailed description with reference to the drawings, the above and other objectives, features, and advantages of example embodiments of the present disclosure will become more apparent. In the drawings, the same or similar reference signs represent the same or similar components.

DETAILED DESCRIPTION

Embodiments of the present disclosure will be described in more detail below with reference to the accompanying drawings. While certain embodiments of the present disclosure have been illustrated in the accompanying drawings, it is to be understood that the disclosure may be embodied in various forms and should not be construed as limited to the embodiments set forth herein; rather, these embodiments are provided so that this disclosure will be thorough and complete. It is to be understood that the drawings and embodiments of the present disclosure are for illustrative purposes only and are not intended to limit the scope of the present disclosure.

As used herein, the term "includes" and its variants are to be read as open-ended terms that mean "includes, but is not limited to." The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

As previously mentioned, for the ripple component, which is twice the power frequency, existing in a rectifier such as a wireless charger, although it has been proposed to use a segmented control loop parameter and a temperature compensation link to regulate the loop parameter, this is sometimes difficult to achieve.

Figure 1:
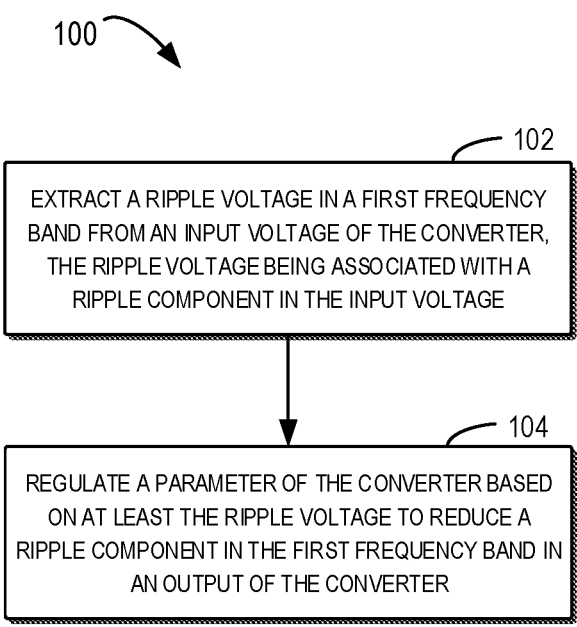
FIG. 1 illustrates a flow chart of a method of regulating a converter according to an exemplary embodiment of the present disclosure.

In order to at least partially address the problem, the present disclosure proposes a manner of regulation for feedforward control. FIG. 1 illustrates a flow chart of a method of regulating a converter according to an exemplary embodiment of the present disclosure. FIGS. 2 to 5 illustrate diagrams of an apparatus for regulating a converter according to different exemplary embodiments of the present disclosure, respectively.

An illustrative embodiment of the present disclosure is described below in conjunction with FIGS. 1 and 2. As shown, at block 102, the method 100 includes extracting a ripple voltage $U_r$ in a first frequency band from an input voltage $U_i$ of the converter, the ripple voltage $U_r$ being associated with a ripple component in the input voltage $U_i$. In some embodiments, the first frequency band may be a lower frequency of the input voltage $U_i$, e. g., the first frequency band may be a frequency band around 100 Hz. Of course, it will be appreciated that in other embodiments, the first frequency band may be a frequency band of other values. At block 104, the method 100 includes regulating a parameter of the converter based on at least the ripple voltage $U_r$ to reduce a ripple component in output of the converter corresponding to the first frequency band.

Figure 2:
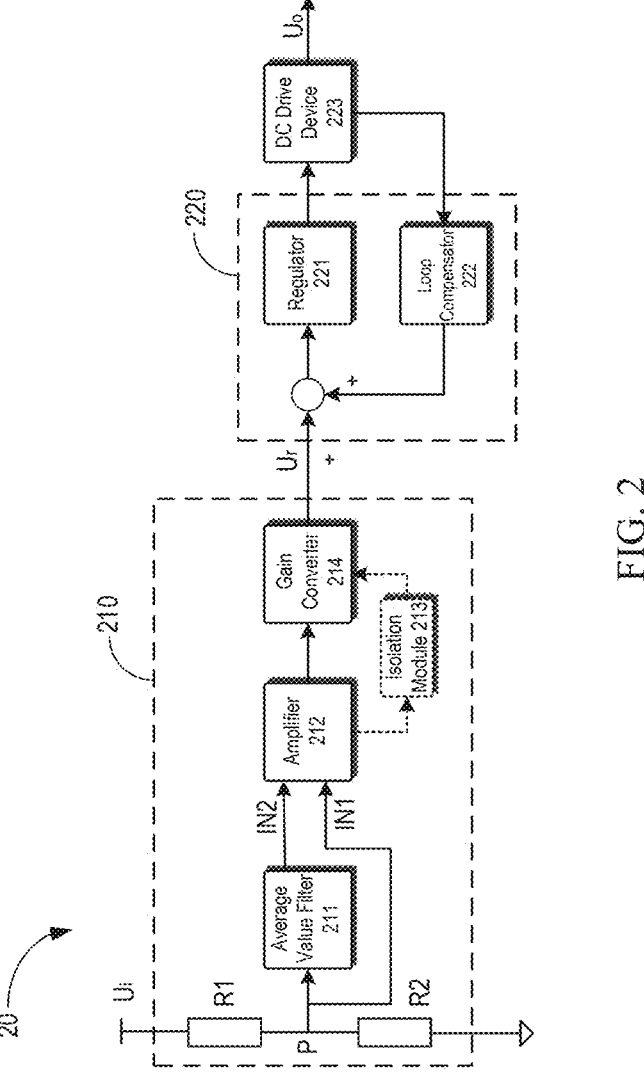
FIG. 2 illustrates an illustration of an apparatus for regulating a converter according to an exemplary embodiment of the present disclosure.

As shown in FIG. 2, the apparatus 20 includes a ripple extraction module 210. The ripple extraction module 210 is configured to extract the ripple voltage $U_r$ from the input voltage $U_i$ of the converter. As shown in FIG. 2, the apparatus 20 also includes a parameter regulation module 220 configured to regulate a parameter of the converter based on at least the ripple voltage $U_r$ to reduce a ripple component in an output of the converter corresponding to the first frequency band.

Since the ripple component in the input voltage $U_i$ has a qualitative relationship with the ripple component in the output of the converter and is also associated with the ripple voltage $U_r$, according to embodiments of the present disclosure, the ripple component in the output of the converter can be reduced or eliminated by taking into account the ripple voltage $U_r$ extracted from the input voltage $U_i$ and regulating the parameter of the converter when regulating the converter. Details of specific extractions and regulations are described further below. It is to be appreciated that embodiments of the present disclosure are not particularly limited as to the specific quantitative relationship between the ripple component in the input voltage $U_i$ and the ripple component in the output of the converter.

As shown in FIG. 2, the ripple extraction module 210 includes a first divider resistor R1 and a second divider resistor R2. The ripple extraction module 210 further includes an amplifier 212, a first input end IN1 of which is coupled to a node P between the first divider resistor R1 and the second divider resistor R2, so as to obtain an instantaneous value of the voltage at the node P. The instantaneous value is associated with the instantaneous value of the input voltage $U_i$, and more specifically, the instantaneous value magnitude of the voltage at the node P is proportional to the instantaneous value magnitude of the input voltage $U_i$ by R2/(R1+R2). The instantaneous value of the input voltage $U_i$ can thus be reflected by means of the instantaneous value of the voltage at the node P. As shown in FIG. 2, the ripple extraction module 210 further includes an average value filter 211, the input end of which is coupled to the node P between the first divider resistor R1 and the second divider resistor R2. The average value filter 211 is used to obtain the average value of the voltage at the node P, and the average is associated with the average value of the input voltage $U_i$, and more specifically, the average size of the voltage at P is proportional to the average size of the input voltage $U_i$ by R2/(R1+R2). The average value of the input voltage $U_i$ can thus be reflected by means of the average value of the voltage at the node P. As shown in FIG. 2, the average value of the voltage at the node P is output to the second input end IN2 of the amplifier 212. The function of the amplifier 212 is to differentiate the instantaneous value of the voltage obtained via the first input end IN1 from the average value of the voltage obtained via the second input end IN2 and to output this difference to a gain converter 214. By scaling this difference by the gain converter 214, a suitable ripple voltage $U_r$ can be obtained. In this way, the platform voltage in the input voltage $U_i$ can be removed by extracting and transforming the input voltage $U_i$, leaving only the corresponding voltage for the fluctuating part. Thus, the ripple voltage $U_r$ corresponding to the ripple of the input voltage $U_i$ can be accurately extracted. Furthermore, since the extracted signal is a voltage signal suitable for processing, the effective measurement range of the device can be maximally utilized, whereby the resolution can be improved.

In some embodiments, the amplifier 212 may be a differential mode amplifier. Of course, other types of amplifiers may be used, and the particular type is not limited by the embodiments of the present disclosure.

In some embodiments, it is required to provide an isolation module 213 between the amplifier 212 and the gain converter 214. Specifically, in some embodiments, if the control module is located on the primary side of the converter, there is no need to provide the isolation module 213. In some embodiments, if the control module is located on the secondary side of the converter, there is a need to provide the isolation module 213.

Figure 6:
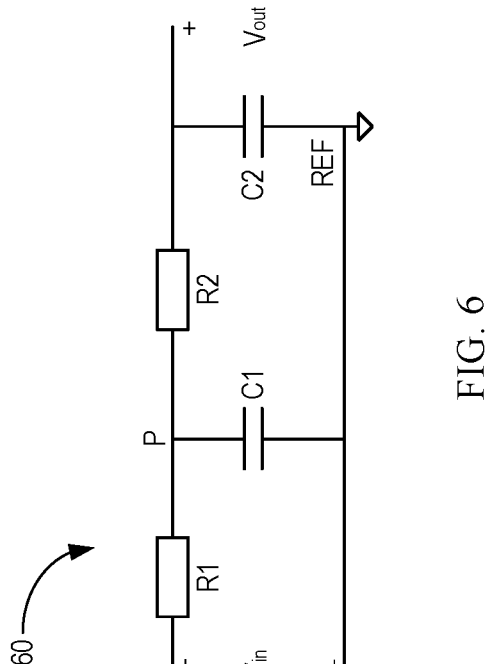
FIG. 6 illustrates a diagram of an average value filter according to an exemplary embodiment of the present disclosure.

FIG. 6 illustrates a diagram of an average value filter 60. The average value filter 211 in FIG. 2 may be implemented using the average value filter 60 in FIG. 6. As shown in FIG. 6, the average value filter 60 may take a passive form, specifically including in particular resistors R1, R2 and capacitors C1, C2, wherein one end of the resistor R1 is connected to the input Vin of the average value filter 60 and one end of the resistor R2 is connected to the output Vout of the average value filter 60. The capacitor C1 is coupled between the node P between the resistors R1, R2 and a reference end REF, and the capacitor C2 is coupled between output Vout of the average value filter 60 and the reference end REF. With an alternative embodiment of the average value filter 60 shown in FIG. 6, the average value of the input Vin can be taken and compared with the instantaneous value of the voltage by the amplifier 212 in FIG. 2. It is to be noted that FIG. 6 is merely one possible implementation of the average value filter 60, and the average value filter 60 according to embodiments of the present disclosure may take various forms, and embodiments of the present disclosure are not particularly limited in this respect.

Figure 3:
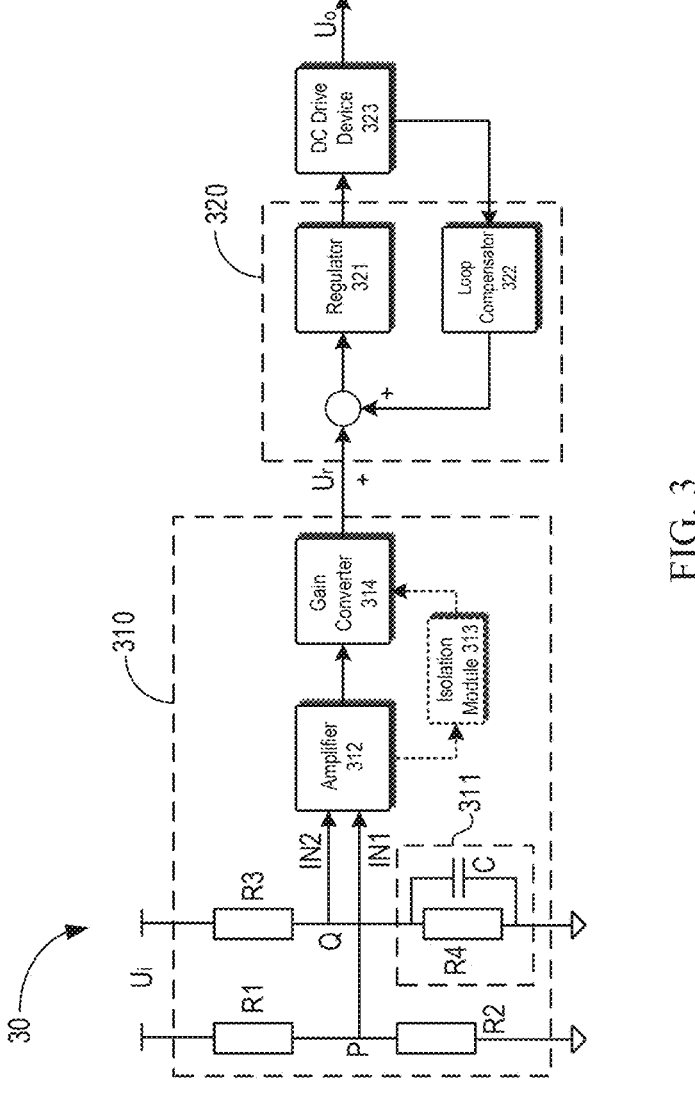
FIG. 3 illustrates an illustration of an apparatus for regulating a converter according to another illustrative embodiment of the present disclosure.
Figure 4:
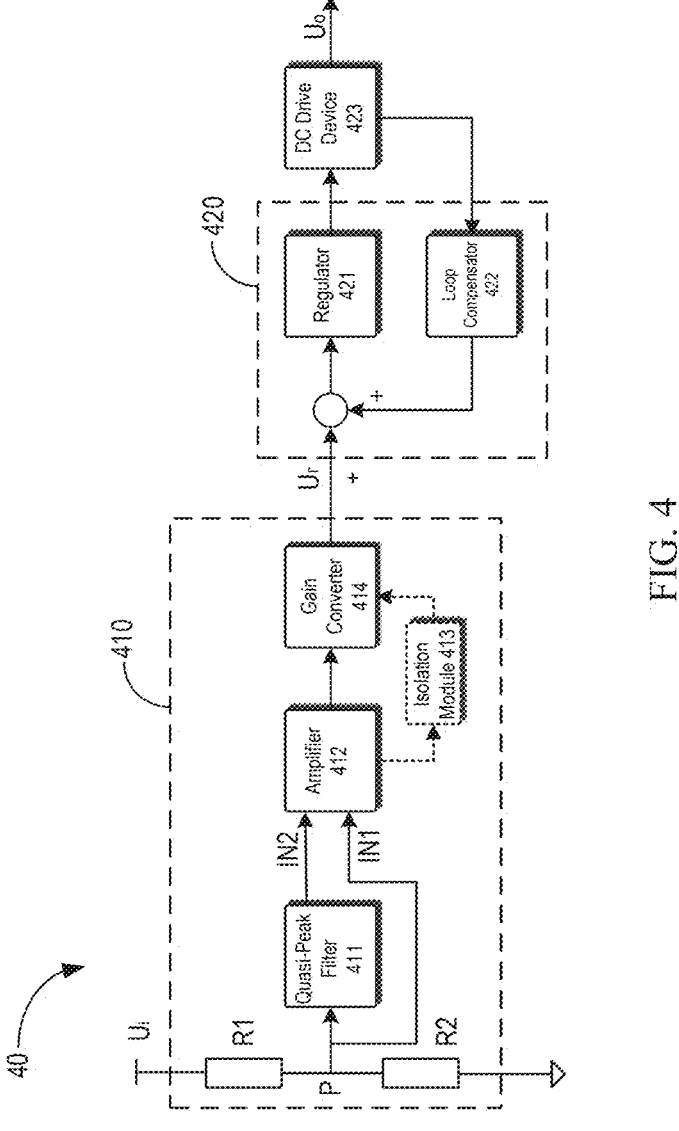
FIG. 4 illustrates an illustration of an apparatus for regulating a converter according to yet another exemplary embodiment of the present disclosure.

Referring back to FIG. 3, as shown, a ripple extraction module 310 includes a first divider resistor R1 and a second divider resistor R2. The ripple extraction module 310 further includes an amplifier 312, the first input end IN1 of which is coupled to the node P between the first divider resistor R1 and the second divider resistor R2, so as to obtain the instantaneous value of the voltage at the node P, the instantaneous value being associated with the instantaneous value of the input voltage $U_i$, and more specifically, the instantaneous value magnitude of the voltage at the node P is proportional to the instantaneous value magnitude of the input voltage $U_i$ by R2/(R1+R2). The instantaneous value of the input voltage $U_i$ can thus be reflected by means of the instantaneous value of the voltage at the node P. As shown in FIG. 3, the ripple extraction module 310 further includes an average value filter 311 formed by a resistor R4 and a capacitor C in parallel, the average value filter 311 being coupled in series with the resistor R3 and connected to the input voltage $U_i$, for obtaining an average value of the voltage at a node Q between the average value filter 311 and the resistor R3, the average being associated with the average value of the input voltage $U_i$. More specifically, the average magnitude of the voltage at Q is approximately proportional to the average magnitude of the input voltage $U_i$ by R4/(R3+R4). The average value of the input voltage $U_i$ can thus be reflected by means of the average value of the voltage at the node Q. As shown in FIG. 4, the average value of the voltage at node Q is output to a second input end IN2 of amplifier 312. The function of the amplifier 312 is to differentiate the instantaneous value of the voltage obtained via the first input end IN1 from the average value of the voltage obtained via the second input end IN2 and to output this difference to the gain converter 314. By scaling this difference with the gain converter 314, a suitable ripple voltage $U_r$ can be obtained. Similar to the embodiment in FIG. 2, the platform voltage in the input voltage $U_i$ can be removed by extracting and transforming the input voltage $U_i$, leaving only the corresponding voltage for the fluctuating part. This results in a ripple voltage signal that is accurate and suitable for processing.

In some embodiments, the amplifier 312 in FIG. 3 may be a differential mode amplifier. Of course, other types of amplifiers may be used, and the particular type is not limited by the embodiments of the present disclosure. Similar to FIG. 2, in the embodiment shown in FIG. 3, if the control module is located on the secondary side of the converter, the isolation module 213 needs to be provided between the amplifier 312 and the gain converter 314 to isolate the ripple signal from the control module.

Referring now to FIG. 4, as shown, the ripple extraction module 410 includes the first divider resistor R1 and the second divider resistor R2. The ripple extraction module 410 further includes an amplifier 412 a first input end IN1 of which is coupled to a node P between the first divider resistor R1 and the second divider resistor R2, so as to obtain an instantaneous value of the voltage at the node P, the instantaneous value being associated with an instantaneous value of the input voltage $U_i$. More specifically, the instantaneous value magnitude of the voltage at P is proportional to the instantaneous value magnitude of the input voltage $U_i$ by R2/(R1+R2). The instantaneous value of the input voltage $U_i$ can thus be reflected by means of the instantaneous value of the voltage at the node P. As shown in FIG. 4, the ripple extraction module 410 further includes a quasi-peak filter 411, the input end of which is coupled to the node P between the first divider resistor R1 and the second divider resistor R2. The quasi-peak filter 411 is used to obtain a quasi-peak value of the voltage at node P, which is associated with the quasi-peak value of input voltage $U_i$, and more specifically, the magnitude of the quasi-peak value of the voltage at P is proportional to the magnitude of the quasi-peak value of input voltage $U_i$ by R2/(R1+R2). The quasi-peak value of the input voltage $U_i$ can thus be reflected by means of the quasi-peak value of the voltage at the node P. As shown in FIG. 4, the quasi-peak value of the voltage at node P is output to a second input end IN2 of the amplifier 412. The function of the amplifier 412 is to differentiate the instantaneous value of the voltage obtained via the first input end IN1 from the quasi-peak value of the voltage obtained via the second input end IN2 and to output this difference to the gain converter 414, by scaling this difference with the gain converter 414, a suitable ripple voltage $U_r$ can be obtained. In this way, the platform voltage in the input voltage $U_i$ can be removed by extracting and transforming the input voltage $U_i$, leaving only the corresponding voltage for the fluctuating part. The voltage signal suitable for processing is thus obtained, ensuring the resolution of signal processing.

In some embodiments, the amplifier 412 in FIG. 4 may be a differential mode amplifier. Of course, other types of amplifiers may be used, and the particular type is not limited by the embodiments of the present disclosure. Similar to FIG. 2, in the embodiment shown in FIG. 4, if the control module is located on the secondary side of the converter, an isolation module 413 needs to be provided between the amplifier 412 and the gain converter 414 to isolate the ripple signal from the control module.

Figure 7:
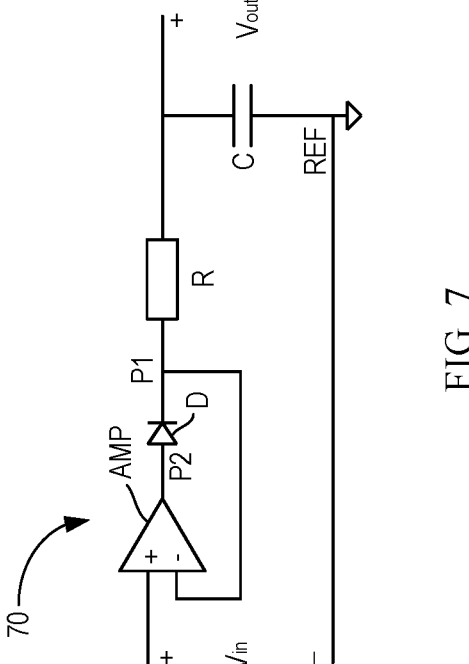
FIG. 7 illustrates a diagram of a quasi-peak filter according to an exemplary embodiment of the present disclosure.

FIG. 7 illustrates a diagram of a quasi-peak filter 70. The quasi-peak filter 411 of FIG. 4 may be implemented using the quasi-peak filter 70 of FIG. 7. As shown in FIG. 7, the quasi-peak filter 70 may take an active form, specifically including an operational amplifier AMP having a non-inverting input end coupled to input Vin of the quasi-peak filter 70 and an inverting input end coupled to one end P1 of the diode D and an output end connected to the other end P2 of the diode D. The quasi-peak filter 70 further includes a resistor R and a capacitor C, wherein a first end of the resistor R is connected to one end P1 of the diode D and a second end is connected to the output Vout of the quasi-peak filter 70. As shown, one end of the capacitor C is connected to the input Vout of the quasi-peak filter 70 and the other end is connected to the reference end REF. With the alternative embodiment of the quasi-peak filter 70 shown in FIG. 7, a quasi-peak of the input Vin can be taken and compared with the instantaneous value of the input voltage by the amplifier 412 in FIG. 4. It is to be noted that FIG. 7 is merely one possible implementation of quasi-peak filter 70 and that quasi-peak filter 70 according to embodiments of the present disclosure may take various forms and that embodiments of the present disclosure are not particularly limited in this respect.

Figure 5:
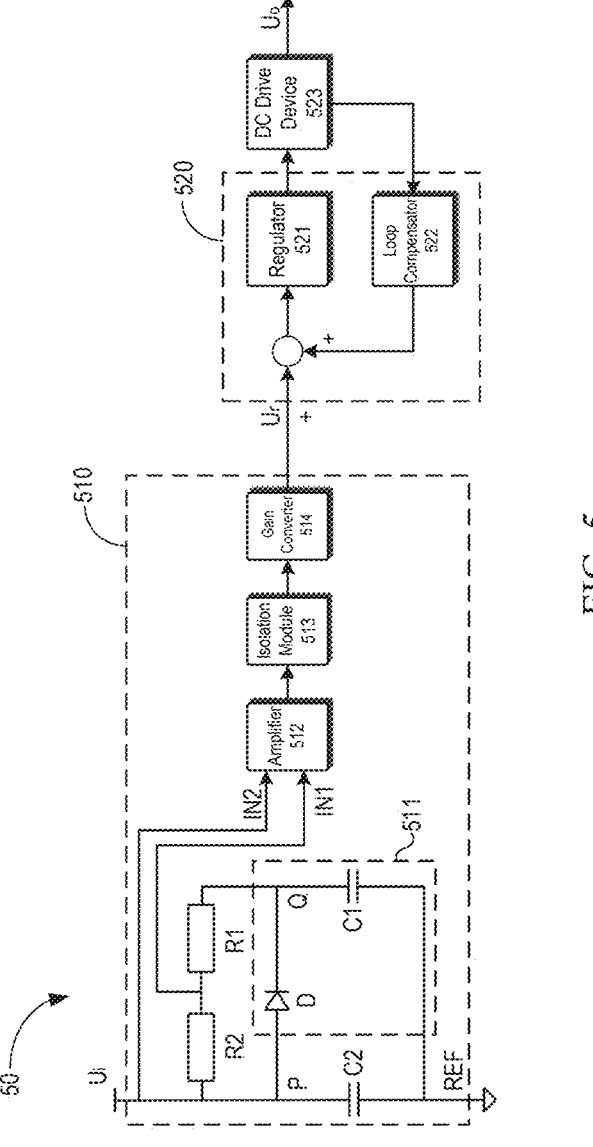
FIG. 5 illustrates an illustration of an apparatus for regulating a converter according to further yet another exemplary embodiment of the present disclosure.

Referring back to FIG. 5, one possible implementation of the ripple extraction module 510 is shown. As shown in FIG. 5, the ripple extraction module 510 includes a quasi-peak filter 511 including a first capacitor C1 and a diode D. The ripple extraction module 510 further includes a second capacitor C2 coupled to the quasi-peak filter 511, wherein one end of the first capacitor C1 and the second capacitor C2 are commonly coupled to the reference end REF, and the other end is coupled to two sides of the diode D. The capacitance value of the second capacitor C2 is much greater than the capacitance value of the first capacitor C1, and the specific value thereof is not limited by the embodiments of the present disclosure. As shown in FIG. 5, the voltage at one end P of the second capacitor C2 corresponds to the instantaneous value of the input voltage $U_i$, while the voltage at one end Q of the first capacitor C1 corresponds to the quasi-peak value of the input voltage $U_i$. With the circuit described above, the voltage across the diode D can be seen as a difference between the instantaneous value of the input voltage $U_i$ and the quasi-peak value. The ripple extraction module 510 also includes a first resistor R1 and a second resistor R2 with a node therebetween coupled to the first input end IN1 of an amplifier 512. Therefore, the first input end IN1 inputs the difference between the instantaneous value of the divided input voltage $U_i$ and the quasi-peak value. The second input end IN2 of the amplifier 512 is coupled to the input voltage $U_i$ as a reference value. Through the amplifier 512, the difference between the instantaneous value and the quasi-peak value of the input voltage $U_i$ can be output to the gain converter 514 through the isolation module 513, and the difference can be scaled by the gain converter 514 to obtain the suitable ripple voltage $U_r$. In this way, the platform voltage in the input voltage $U_i$ can be removed by extracting and transforming the input voltage $U_i$, leaving only the corresponding voltage for the fluctuating part. The voltage signal suitable for processing is thus obtained.

In the embodiment shown in FIG. 5, the isolation module 513 needs to be provided to isolate the ripple extraction module from the control module, whether the control module of the converter is located on the primary side or the secondary side.

Referring back to FIG. 2, as shown, the parameter regulation module 220 includes a regulator 221 and a loop compensator 222. The regulator 221 may be used to regulate the converter taking into account both the signal of the ripple voltage $U_r$ from the ripple extraction module 210 described above and the signal from the loop compensator 222, and to output the regulated signal to a direct current drive device 223. The loop compensator 222 and the DC link 223 may be configured using various known schemes or schemes developed in the future, and the embodiments of the present disclosure are not limited thereto. According to embodiments of the present disclosure, the signal of the ripple voltage $U_r$ from the ripple extraction module 210 is received and emphasized as a consideration factor for the regulation, and by the regulation, the ripple component in the voltage $U_o$ transmitted by the direct current drive device 223 to the downstream load can be reduced or even eliminated.

In some embodiments, the regulator 221 may regulate a pulse width of the converter based on the amplitude of the ripple voltage $U_r$. For example, when the ripple voltage $U_r$ is larger than the average, the pulse width may be decreased according to the ripple amplitude value, whereas when the ripple voltage $U_r$ is smaller than the average, the pulse width may be increased according to the ripple amplitude value. In other embodiments, the regulator 221 may regulate the frequency of the converter based on the magnitude of the ripple voltage $U_r$. In other embodiments, the regulator 221 may regulate a phase shift angle of the converter based on the magnitude of ripple voltage $U_r$. It will also be appreciated that modes other than the ones mentioned here can be used to regulate the converter to reduce the ripple component in the output voltage $U_o$. It is to be noted that although the output voltage is described above as an example, in other embodiments, the output of the direct current drive device 223 may be a current, and the present disclosure is not limited thereto.

The parameter regulation modules 320, 420, 520 of FIGS. 3-5 are similar to the parameter regulation module 220 of FIG. 2 and will not be described in detail herein.

Referring back to FIG. 1, in block 102, extracting the ripple voltage may include: determining, via average value filters 211, 311, an average voltage value associated with the average value of the input voltage $U_i$; determining an instantaneous voltage value associated with the instantaneous value of the input voltage $U_i$ via the divider resistors R1, R2; and extracting the ripple voltage $U_r$ based on a difference between the average voltage value and the instantaneous voltage value via amplifiers 212, 312 coupled to the average value filters 211, 311 and the divider resistors R1, R2.

In some embodiments, extracting the ripple voltage may include: determining the quasi-peak voltage value associated with the quasi-peak value of the input voltage $U_i$ via quasi-peak filters 411, 511; determining, via the divider resistors R1, R2, the instantaneous voltage value associated with the instantaneous value of the input voltage $U_i$; and extracting the ripple voltage $U_r$ based on the difference between the quasi-peak voltage value and the instantaneous voltage value via amplifiers 412, 512 coupled to the quasi-peak filters 411, 511 and the divider resistors R1, R2.

In some embodiments, the method 100 may further include: isolating from the control module via isolation modules 213, 313, 413, 513 coupled to the amplifier, in response to the control module of the converter locating on the secondary side of the converter.

In some embodiments, the method 100 may further include: scaling the difference via gain converter s 214, 314, 414, 514 coupled to the isolation modules 213, 313, 413, 513.

In some embodiments, regulating a parameter of the converter may include regulating one or more of a pulse width, a frequency, and a phase shift angle of the converter based on the amplitude of the ripple voltage $U_r$.

Those skilled in the art will appreciate that the various steps of the methods of the present disclosure described above may be implemented by general purpose computing devices, may be centralized on a single computing device, or may be distributed over a network of multiple computing devices, may alternatively be implemented in program code executable by the computing devices, such that they may be stored in a storage device for execution by the computing devices, may be implemented as separate integrated circuit modules, or multiple modules or steps thereof may be implemented as a single integrated circuit module. As such, the present disclosure is not limited to any particular combination of hardware and software.

It is to be noted that while the regulation scheme of the converter is described above with respect to a wireless charger, it is to be understood that the converter according to embodiments of the present disclosure may be other types of devices besides a wireless charger, e.g., equally applicable to an open loop converter.

It is to be understood that while several means or sub-means of a device have been mentioned in the detailed description above, such division is merely exemplary and not mandatory. Indeed, the features and functions of two or more apparatuses described above may be embodied in one apparatus according to embodiments of the present disclosure. Conversely, the features and functions of one apparatus described above may be further divided into embodiments that are embodied by multiple apparatuses.

The above description is merely an alternative embodiment of the present disclosure and is not intended to limit the present disclosure, as various modifications and variations of the present disclosure will occur to those skilled in the art. Any modifications, equivalents, improvements, etc. That come within the spirit and scope of the disclosure are intended to be embraced therein.

We claim:

1. A method of regulating a converter, the method comprising:

extracting a ripple voltage in a first frequency band from an input voltage of the converter, the ripple voltage being associated with a ripple component in the input voltage; and regulating a parameter of the converter based on at least the ripple voltage to reduce the ripple component in the first frequency band in an output of the converter, wherein regulating the parameter of the converter comprises:

regulating, based on an amplitude of the ripple voltage, one or more of a pulse width, a frequency, and a phase shift angle of the converter, wherein extracting the ripple voltage comprises:

determining a quasi-peak voltage value associated with a quasi-peak value of the input voltage via a quasi-peak filter, wherein the quasi-peak filter further comprises:

an operational amplifier having an inverting input end and a non-inverting input end connected to an input end of the quasi-peak filter;

a diode, wherein a first end of the diode is connected to an output end of the operational amplifier and a second end of the diode is connected to the first end of the diode and the inverting input end of the operational amplifier;

a resistor, wherein a first end of the resistor is connected to the second end of the diode and a second end of the resistor is connected to an output end of the quasi-peak filter; and a capacitor, wherein a first end of the capacitor is connected to the output end of the quasi-peak filter and a second end of the capacitor is connected to a reference end.

2. The method of claim 1, wherein extracting the ripple voltage further comprises:

determining, via a divider resistor, an instantaneous voltage value associated with an instantaneous value of the input voltage; and extracting, via an amplifier coupled to the quasi-peak filter and the divider resistor, the ripple voltage based on a difference between the quasi-peak voltage value and the instantaneous voltage value.

3. The method of claim 1, wherein the quasi-peak filter comprises a passive filter or an active filter.

4. The method of claim 1, wherein the converter is included in a wireless charger.

5. An apparatus for regulating a converter, the apparatus comprising:

a ripple extraction module configured to extract a ripple voltage in a first frequency band from an input voltage of the converter, the ripple voltage being associated with a ripple component in the input voltage; and a parameter regulation module configured to regulate a parameter of the converter based on at least the ripple voltage to reduce the ripple component in the first frequency band in an output of the converter, wherein the parameter regulation module is configured to:

regulate, based on an amplitude of the ripple voltage, one or more of a pulse width, a frequency, and a phase shift angle of the converter, wherein the ripple extraction module comprises a quasi-peak filter configured to determine a quasi-peak voltage value associated with a quasi-peak value of the input voltage, wherein the quasi-peak filter further comprises:

an operational amplifier having an inverting input end and a non-inverting input end connected to an input end of the quasi-peak filter;

a diode, wherein a first end of the diode is connected to an output end of the operational amplifier and a second end of the diode is connected to the first end of the diode and the inverting input end of the operational amplifier;

a resistor, wherein a first end of the resistor is connected to the second end of the diode and a second end of the resistor is connected to an output end of the quasi-peak filter; and a capacitor, wherein a first end of the capacitor is connected to the output end of the quasi-peak filter and a second end of the capacitor is connected to a reference end.

6. The apparatus of claim 5, wherein the ripple extraction module further comprising:

a divider resistor configured to determine an instantaneous voltage value associated with an instantaneous value of the input voltage; and an amplifier coupled to the quasi-peak filter and the divider resistor and configured to extract the ripple voltage based on a difference between the quasi-peak voltage value and the instantaneous voltage value.

7. The apparatus of claim 5, wherein the quasi-peak filter comprises a passive filter or an active filter.

8. The apparatus of claim 5, wherein the converter is included in a wireless charger.

* * * * *